US 011052981B2

(12) United States Patent
Heinen et al.

(10) Patent No.: US 11,052,981 B2
(45) Date of Patent: Jul. 6, 2021

(54) SYSTEMS AND METHODS FOR AUGMENTING POWER GENERATION BASED ON THERMAL ENERGY CONVERSION USING SOLAR OR RADIATED THERMAL ENERGY

(71) Applicant: Raytheon Company, Waltham, MA (US)

(72) Inventors: Gregory W. Heinen, Lowell, MA (US); Jon S. Rawstron, Northboro, MA (US)

(73) Assignee: Raytheon Company, Waltham, MA (US)

( * ) Notice: Subject to any disclaimer, the term of this patent is extended or adjusted under 35 U.S.C. 154(b) by 805 days.

(21) Appl. No.: 15/725,538

(22) Filed: Oct. 5, 2017

(65) Prior Publication Data

US 2018/0118315 A1  May 3, 2018

Related U.S. Application Data

(60) Provisional application No. 62/414,216, filed on Oct. 28, 2016.

(51) Int. Cl.
*B63G 8/00* (2006.01)
*H02K 7/18* (2006.01)
(Continued)

(52) U.S. Cl.
CPC ............ *B63G 8/001* (2013.01); *B63B 22/18* (2013.01); *F03G 6/00* (2013.01); *F24S 10/40* (2018.05);
(Continued)

(58) Field of Classification Search
CPC . F24S 10/45; F24S 10/25; F24S 10/40; C23C 28/42; C23C 28/345; B63B 22/18;
(Continued)

(56) References Cited

U.S. PATENT DOCUMENTS 1,315,267 A   9/1919 White
1,361,561 A   12/1920 Yancey
(Continued)

FOREIGN PATENT DOCUMENTS

DE         215277 C      12/1906
EP       2660433 A1      11/2013
(Continued)

OTHER PUBLICATIONS

International Search Report and Written Opinion of the International Search Authority for PCT Patent Application No. PCT/US2017/016976 dated Feb. 12, 2018, 18 pages.
(Continued)

*Primary Examiner* — Mark A Laurenzi
*Assistant Examiner* — Mickey H France

(57) ABSTRACT

An apparatus includes first and second tanks each configured to receive and store a refrigerant under pressure. The apparatus also includes at least one generator configured to generate electrical power based on a flow of the refrigerant between the tanks. The apparatus further includes a collector configured to transfer solar thermal energy to one of the tanks to heat the refrigerant in that tank and/or radiate thermal energy from one of the tanks into an ambient environment to cool the refrigerant in that tank. In addition, the apparatus could include first and second insulated water jackets each configured to receive and retain water, where the first tank is located within the first insulated water jacket and the second tank is located within the second insulated water jacket.

20 Claims, 9 Drawing Sheets

(51) Int. Cl.
*B63B 22/18* (2006.01)
*F24S 10/95* (2018.01)
*F03G 6/00* (2006.01)
*F24S 10/40* (2018.01)
*F03B 3/04* (2006.01)

(52) U.S. Cl.
CPC ............ *F24S 10/95* (2018.05); *H02K 7/1823* (2013.01); *B63B 2211/02* (2013.01); *B63G 2008/002* (2013.01); *B63G 2008/004* (2013.01); *F03B 3/04* (2013.01); *F05B 2220/706* (2013.01)

(58) Field of Classification Search
CPC .. B63B 2211/02; H02K 7/1823; B63G 8/001; B63G 2008/002; B63G 2008/004; F03B 3/04; F05B 2220/706; F03G 2006/006; F03G 2006/008; F03G 2006/061; F03G 2006/062; F03G 6/00–6/068
USPC ............................................. 60/641.8–641.15
See application file for complete search history.

(56) References Cited

U.S. PATENT DOCUMENTS

| | | | |
|---|---|---|---|
| 1,421,369 A | 7/1922 | Krdo | |
| 1,710,670 A | 4/1929 | Bonney | |
| 2,000,746 A | 5/1935 | Dray | |
| 2,381,478 A | 8/1945 | Zukor | |
| 2,537,929 A | 1/1951 | Daly et al. | |
| 2,642,693 A | 6/1953 | Broady | |
| 2,720,367 A | 10/1955 | Doolittle | |
| 2,750,794 A | 6/1956 | Downs | |
| 2,783,955 A | 3/1957 | Fitz Patrick | |
| 2,823,636 A | 2/1958 | Gongwer et al. | |
| 2,826,001 A | 3/1958 | Presnell | |
| 2,845,221 A | 7/1958 | Vine et al. | |
| 2,911,792 A | 11/1959 | Rinia | |
| 2,964,874 A | 12/1960 | Ruiz | |
| 3,157,145 A | 11/1964 | Farris et al. | |
| 3,275,418 A | 9/1966 | Nee | |
| 3,376,588 A | 4/1968 | Berteaux et al. | |
| 3,698,345 A | 10/1972 | Kreitner | |
| 3,815,555 A | 6/1974 | Tubeuf | |
| 3,818,523 A | 6/1974 | Stillman, Jr. | |
| 3,901,033 A | 8/1975 | McAlister | |
| 3,918,263 A | 11/1975 | Swingle | |
| 4,255,934 A * | 3/1981 | Stephenson | F01K 21/005 60/655 |
| 4,403,154 A | 9/1983 | Reale et al. | |
| 4,445,818 A | 5/1984 | Ohsaki et al. | |
| 4,577,583 A | 3/1986 | Green, II | |
| 4,850,551 A | 7/1989 | Krawetz et al. | |
| 4,919,637 A | 4/1990 | Fleischmann | |
| 5,134,955 A | 8/1992 | Mantield | |
| 5,291,847 A | 3/1994 | Webb | |
| 5,303,552 A | 4/1994 | Webb | |
| 5,579,640 A | 12/1996 | Gray, Jr. et al. | |
| 5,615,632 A | 4/1997 | Nedderman, Jr. | |
| 6,142,092 A | 11/2000 | Coupland | |
| 6,263,819 B1 | 7/2001 | Gorustein et al. | |
| 6,328,622 B1 | 12/2001 | Geery | |
| 8,046,990 B2 | 11/2011 | Bollinger et al. | |
| 8,069,808 B1 | 12/2011 | Imlach et al. | |
| 8,117,842 B2 | 2/2012 | McBride et al. | |
| 8,205,570 B1 | 6/2012 | Tureaud et al. | |
| 9,835,145 B1 * | 12/2017 | Freeman | F04B 9/113 |
| 2006/0059912 A1 | 3/2006 | Romanelli et al. | |
| 2007/0186553 A1 | 8/2007 | Lin | |
| 2008/0088171 A1 | 4/2008 | Cheng | |
| 2009/0126364 A1 * | 5/2009 | Mills | F03G 6/06 60/641.8 |
| 2009/0178603 A1 | 7/2009 | Imlach et al. | |
| 2009/0277400 A1 | 11/2009 | Conry | |
| 2010/0192575 A1 | 8/2010 | Al-Mayahi et al. | |
| 2010/0319339 A1 | 12/2010 | Davis | |
| 2010/0327605 A1 | 12/2010 | Andrews | |
| 2011/0051880 A1 | 3/2011 | Al-Mayahi et al. | |
| 2011/0101579 A1 | 5/2011 | Polakowski et al. | |
| 2011/0113806 A1 * | 5/2011 | King | F24S 10/72 62/235.1 |
| 2011/0167825 A1 | 7/2011 | Mauran et al. | |
| 2011/0314811 A1 | 12/2011 | Jones et al. | |
| 2012/0091942 A1 | 4/2012 | Jones et al. | |
| 2012/0260908 A1 * | 10/2012 | Orsello | F24S 23/77 126/643 |
| 2012/0289103 A1 | 11/2012 | Hudson et al. | |
| 2013/0068973 A1 | 3/2013 | van Ruth | |
| 2013/0180243 A1 | 7/2013 | Hurtado | |
| 2015/0369221 A1 | 12/2015 | Minovitch | |
| 2018/0119990 A1 | 5/2018 | Alsadah | |
| 2018/0209308 A1 | 7/2018 | Heinen et al. | |

FOREIGN PATENT DOCUMENTS

| | | | |
|---|---|---|---|
| EP | 2698506 A1 | 2/2014 | |
| GB | 235363 A | 6/1925 | |
| GB | 541775 A | 12/1941 | |
| GB | 658070 A | 10/1951 | |
| GB | 2422877 A | 8/2006 | |
| WO | 2011000062 A1 | 1/2011 | |
| WO | WO-2015161921 A1 * | 10/2015 | F03G 6/065 |

OTHER PUBLICATIONS

Office Action dated Mar. 3, 2020 in connection with Japanese Patent Application No. 2018-546519, 7 pages.

Heinen, "Hydraulic Drives for Use in Charging Systems, Ballast Systems, or Other Systems of Underwater Vehicles," U.S. Appl. No. 15/173,214, filed Jun. 3, 2016, 40 pages.

Heinen et al., "Systems and Methods Supporting Periodic Exchange of Power Supplies in Uderwater Vehicles or Other Devices," U.S. Appl. No. 15/264,399, filed Sep. 13, 2016, 51 pages.

Bowen, "A Passive Capture Latch for Odyssey-Class AUVs," Technical Report WHOI-98-12, Jun. 1998, 91 pages, publisher Woods Hole Oceanographic Institution, Woods Hole, MA.

Singh et al., "Docking for an Autonomous Ocean Sampling Network," IEEE Journal of Oceanic Engineering, Oct. 2001, pp. 498-514, vol. 26, No. 4, publisher IEEE, Piscataway, New Jersey.

Bowen et al., "The Nereus Hybrid Underwater Robotic Vehicle for Global Ocean Science Operations to 11,000m Depth," 2008, 10 pages, publisher IEEE, Piscataway, New Jersey.

Hardy et al., "Unmanned Underwater Vehicle (UUV) deployment and retrieval considerations for submarines," Paper on UUV Deployment and Retrieval Options for Submarines, Apr. 2008, 15 pages, publisher BMT Defence Services Ltd., Bath, United Kingdom.

Cowen, "Flying Plug: A Small UUV Designed for Submarine Data Connectivity (U)," Abstract, 1997, 21 pages, publisher PN.

Gish, "Design of an AUV Recharging System," 2004, 134 pages, publisher Massachusetts Institute of Technology, Cambridge, Massachusetts.

Vandenberg, "Manning and Maintainability of a Submarine Unmanned Undersea Vehicle (UUV) Program: A Systems Engineering Case Study," Thesis, Sep. 2010, 137 pages, publisher Naval Postgraduate School, Monterey, California.

Griffiths, "Technology and Applications of Autonomous Underwater Vehicles," 2003, 18 pages, publisher Taylor & Francis, New York, NY.

Galletti di Cadilhac, "Docking Systems," 2003, pp. 93-108, publisher Taylor & Franscis, New York, NY.

Singh et al., "AOSN MURI: Docking for an Autonomous Ocean Sampling Network," Program #: ONR-322 OM/AOSN N00014-95-1-1316, 1998, 6 pages, available at http://www.whoi.edu/DSL/hanu/.

Mosca et al., "Low-Frequency Acoustic Source for AUV Long-Range Communication", iXSea, France, JAMSTEC, Japan, Jun. 2011, 9 pages.

(56) References Cited

OTHER PUBLICATIONS

Chao, "Diurnal Variability Part I: Global 1-km SST (G1SST) Part II:GHRSST-DV-Argo Obs. System", California Institute of Technology, Feb. 2011, 19 pages.
Jones et al., "Novel Thermal Powered Technology for UUV Persistant Surveillance", California Institute of Technology, Feb. 2006, 11 pages.
Shimura et al., "Long-Range Time Reversal Communication in Deep Water: Experimental Results", J. Acoust. Soc. Am. 132 (1), Jun. 2012, 5 pages.
NASA,"Utilizing Ocean Thermal Energy in a Submarine Robot", NASA's Jet Propulsion Laboratory, NASA Tech Briefs NPO-43304, Dec. 2008, 4 pages.
Huntsberger et al., "Advanced Energy Storage System for Thermal Engines", California Institute of Technology, Jan. 2013, 16 pages.
Huntsberger et al., "Slocum-TREC Thermal Glider", California Institute of Technology, Jan. 2012, 16 pages.
Heinen et al., "Apparatus and Method for Periodically Charging Ocean Vessel or Other System Using Thermal Energy Conversion", U.S. Appl. No. 15/173,178, filed Jun. 3, 2016, 54 pages.
Heinen, "Modified CO2 Cycle for Long Endurance Unmanned Underwater Vehicles and Resultant Chirp Acoustic Capability", U.S. Appl. No. 15/091,415, filed Apr. 5, 2016, 40 pages.
International Search Report and Written Opinion of the International Searching Authority dated May 18, 2017 for PCT Application No. PCT/US2016/062518, 12 pages.
Heinen, "Systems and Methods for Power Generation Based on Surface Air-To-Water Thermal Differences", U.S. Appl. No. 15/787,948, filed Oct. 19, 2017, 35 pages.
International Search Report and Written Opinion of the International Searching Authority dated May 29, 2017 for PCT Application No. PCT/US2017/017499, 13 pages.
Decision of Refusal dated Oct. 13, 2020 in connection with Japanese Patent Application No. 2018-546519, 6 pages.
Office Action dated Aug. 25, 2020 in connection with U.S. Appl. No. 16/384,012, 6 pages.
International Search Report and Written Opinion of the International Searching Authority in connection with International Patent Application No. PCT/US2020/032057 dated Aug. 4, 2020, 8 pages.
Jones et al., "Novel Thermal Powered Technology for UUV Persistent Surveillance", A Presentation to the ONR Joint Review of Unmanned Systems Technology Development, Feb. 2016, 11 pages.
Chao, "Diurnal Variability, Part I: Global 1-km SST (G1SST), Part II: GHRSST-DV-Argo Obs. Systems", Feb. 2011, 19 pages.
Swean, Jr., "ONR Unmanned Sea Vehicle Technology Development, AUVSI's Unmanned Systems Program Review 2008", Feb. 2008, 34 pages.
Chao, "Thermal Recharging Battery for Underwater Instrumentations", Oct. 2013, 1 page.
Chao, "Autonomous Underwater Vehicles and Sensors Powered by Ocean Thermal Energy", ORE Seminar, Jan. 2016, 1 page.
Huntsberger et al., "Advanced Energy Storage System for Thermal Engines, AUVSI Annual Review", Jet Propulsion Laboratory, California Institute of Technology, Jan. 2013, 16 pages.
Communication under Rule 71(3) EPC dated Nov. 3, 2020 in connection with European Patent Application No. 17749575.1, 26 pages.
Decision to Refuse dated Oct. 13, 2020 in connection with Japanese Patent Application No. 2018-546519, 6 pages.
Office Action dated Jan. 29, 2021 in connection with U.S. Appl. No. 16/451,852, 15 pages.

\* cited by examiner

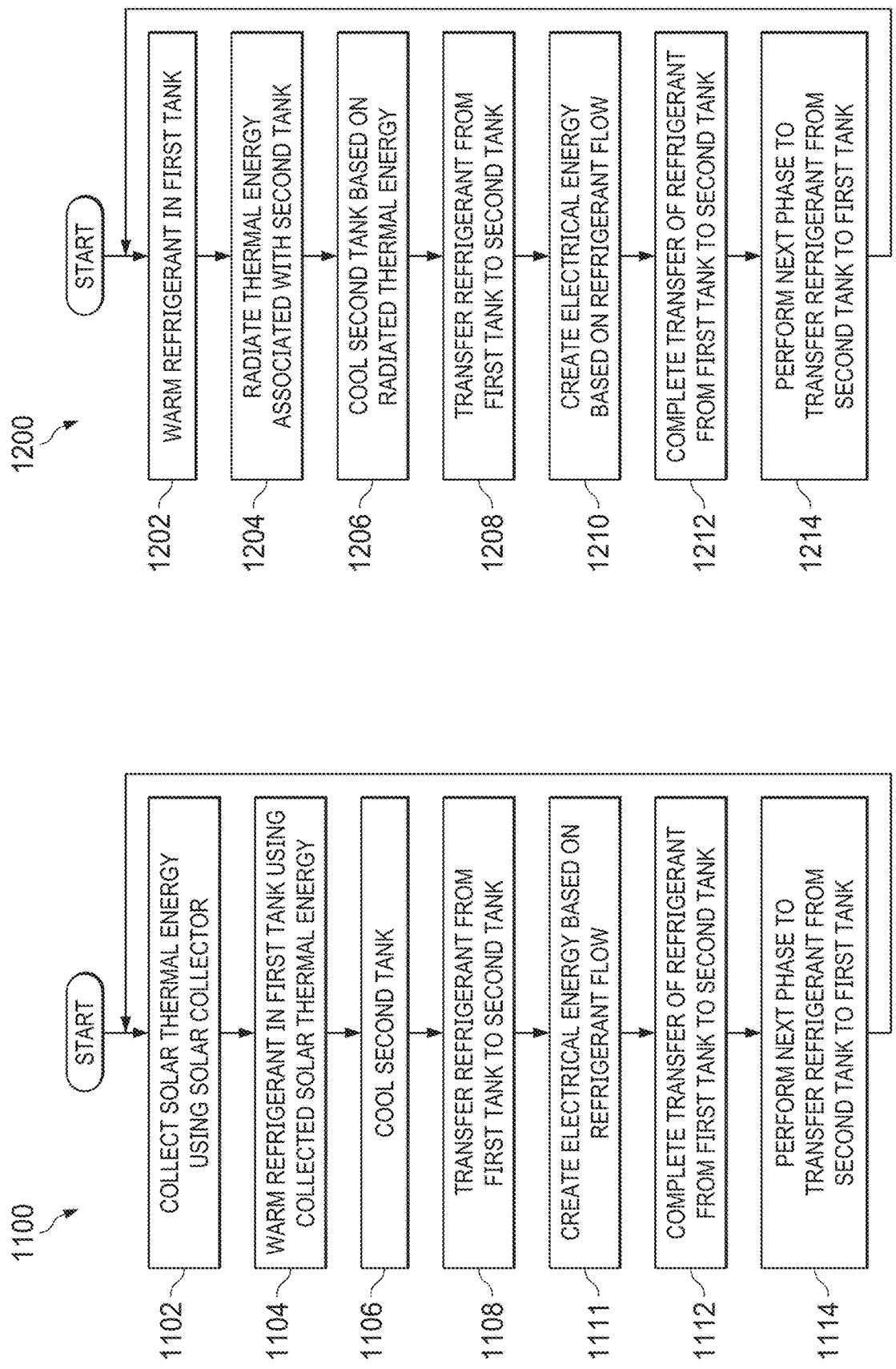

SYSTEMS AND METHODS FOR AUGMENTING POWER GENERATION BASED ON THERMAL ENERGY CONVERSION USING SOLAR OR RADIATED THERMAL ENERGY

CROSS-REFERENCE TO RELATED APPLICATION AND PRIORITY CLAIM

This application claims priority under 35 U.S.C. § 119(e) to U.S. Provisional Patent Application No. 62/414,216 filed on Oct. 28, 2016. This provisional application is hereby incorporated by reference in its entirety.

TECHNICAL FIELD

This disclosure generally relates to power generation systems, such as power generation systems that operate based on thermal energy conversion. More specifically, this disclosure relates to systems and methods for augmenting power generation based on thermal energy conversion using solar or radiated thermal energy.

BACKGROUND

Unmanned underwater vehicles (UUVs) can be used in a number of applications, such as undersea surveying, recovery, or surveillance operations. However, supplying adequate power to UUVs for prolonged operation can be problematic. For example, one prior approach simply tethers a UUV to a central power plant and supplies power to the UUV through the tether. However, this clearly limits the UUV's range and deployment, and it can prevent the UUV from being used in situations requiring independent or autonomous operation. Another prior approach uses expanding wax based on absorbed heat to generate power, but this approach provides power in very small amounts, typically limited to less than about 200 Watts (W) at a 2.2 Watt-hour (WHr) capacity. Yet another prior approach involves using fuel cells in a UUV to generate power, but fuel cells typically require large packages and substantial space.

SUMMARY

This disclosure provides systems and methods for augmenting power generation based on thermal energy conversion using solar or radiated thermal energy.

In a first embodiment, an apparatus includes first and second tanks each configured to receive and store a refrigerant under pressure. The apparatus also includes at least one generator configured to generate electrical power based on a flow of the refrigerant between the tanks. The apparatus further includes a collector configured to transfer solar thermal energy to one of the tanks to heat the refrigerant in that tank and/or radiate thermal energy from one of the tanks into an ambient environment to cool the refrigerant in that tank.

In a second embodiment, a system includes an underwater vehicle having a body, fins projecting from the body, and a power generation system. The power generation system includes first and second tanks each configured to receive and store a refrigerant under pressure. The power generation system also includes at least one generator configured to generate electrical power based on a flow of the refrigerant between the tanks. The power generation system further includes a collector configured to transfer solar thermal energy to one of the tanks to heat the refrigerant in that tank and/or radiate thermal energy from one of the tanks into an ambient environment to cool the refrigerant in that tank.

In a third embodiment, a method includes generating electrical power based on a flow of refrigerant between first and second tanks. Each of the tanks is configured to receive and store the refrigerant under pressure. The method also includes transferring solar thermal energy to one of the tanks to heat the refrigerant in that tank and/or radiating thermal energy from one of the tanks into an ambient environment to cool the refrigerant in that tank.

Other technical features may be readily apparent to one skilled in the art from the following figures, descriptions, and claims.

BRIEF DESCRIPTION OF THE DRAWINGS

For a more complete understanding of this disclosure, reference is made to the following description, taken in conjunction with the accompanying drawings, in which:

FIGS. 11 and 12 illustrate example methods for augmenting power generation based on thermal energy conversion using solar or radiated thermal energy in accordance with this disclosure.

DETAILED DESCRIPTION

FIGS. 1 through 12, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

FIGS. 1A through 1D illustrate a first example underwater vehicle 100 that augments power generation based on thermal energy conversion using solar or radiated thermal energy in accordance with this disclosure. In this example, the vehicle 100 represents an unmanned underwater vehicle or other device that can function as both a buoy and a glider within an ocean or other body of water. The vehicle 100 can be used to support various functions, such as undersea surveying, recovery, or surveillance operations.

Figure 1A:
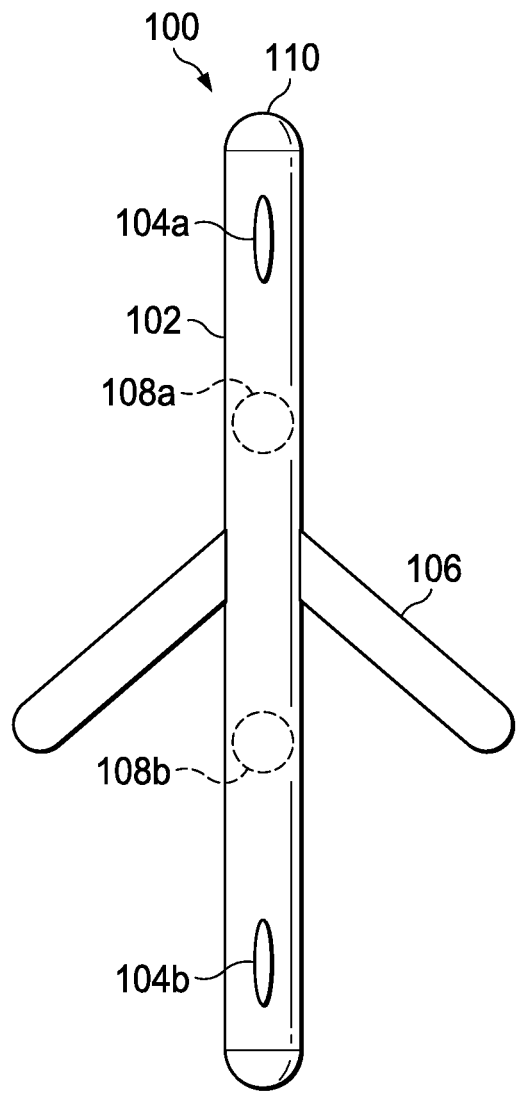
FIGS. 1A through 1D illustrate a first example underwater vehicle that augments power generation based on thermal energy conversion using solar or radiated thermal energy in accordance with this disclosure.
Figure 1B:
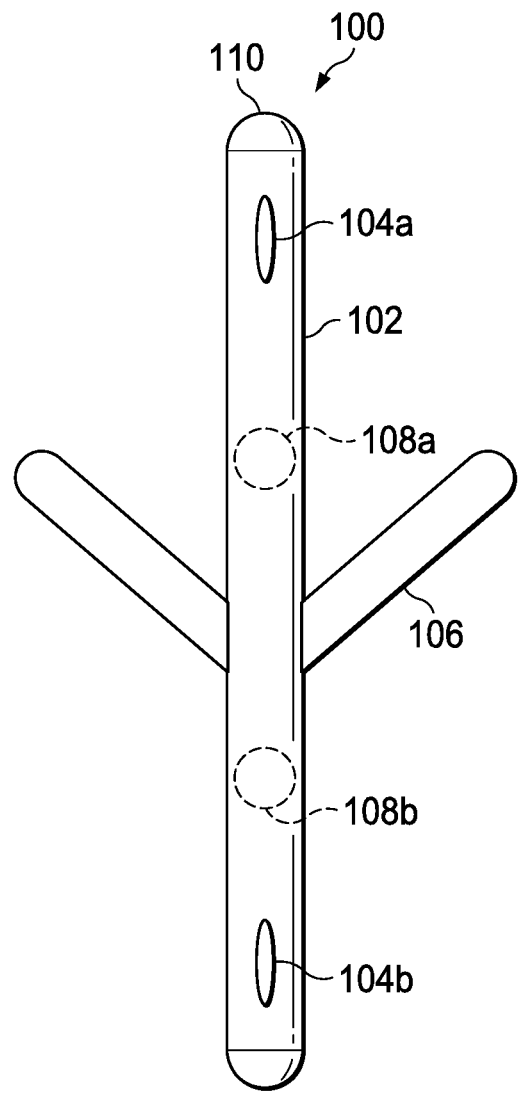

As shown in FIGS. 1A and 1B, the vehicle 100 includes a body 102 having fins 104a-104b and wings 106. The body 102 represents any suitable structure configured to encase, protect, or otherwise contain other components of the vehicle 100. The body 102 can be formed from any suitable material(s) and in any suitable manner. The body 102 can be formed so that the vehicle 100 is able to withstand extremely elevated pressures found at deep depths in an ocean or other body of water. In some embodiments, the body 102 can allow the vehicle 100 to operate at depths of up to 1,000 meters or more.

The fins 104a-104b represent projections from the body 102 that help to stabilize the body 102 during travel. Each of the fins 104a-104b can be formed from any suitable material(s) and in any suitable manner. Also, each of the fins 104a-104b can have any suitable size, shape, and dimensions. Further, at least some of the fins 104a-104b can be movable or adjustable to help alter the course of the body 102 and to steer the body 102 through water during travel. In addition, the numbers and positions of the fins 104a-104b shown here are examples only, and any numbers and positions of fins can be used to support desired operations of the vehicle 100.

In some embodiments, the underwater vehicle 100 can both ascend and descend within a body of water during use. In these embodiments, the fins 104a can be used to steer the vehicle 100 while ascending, and the fins 104b can be used to steer the vehicle 100 while descending. Moreover, when the vehicle 100 is ascending, the fins 104a can be used to control the pitch of the vehicle 100, and a differential between the fins 104a can be used to control the roll of the vehicle 100. Similarly, when the vehicle 100 is descending, the fins 104b can be used to control the pitch of the vehicle 100, and a differential between the fins 104b can be used to control the roll of the vehicle 100.

The wings 106 support gliding movement of the vehicle 100 underwater. The wings 106 are moveable to support different directions of travel. For example, the wings 106 are swept downward in FIG. 1A when the vehicle 100 is ascending, and the wings 106 are swept upward in FIG. 1B when the vehicle 100 is descending. In this way, the wings 106 help to facilitate easier or more rapid movement of the vehicle 100 while ascending or descending. Each of the wings 106 can be formed from any suitable material(s) and in any suitable manner. Also, each of the wings 106 can have any suitable size, shape, and dimensions. In addition, the number and positions of the wings 106 shown here are examples only, and any number and positions of wings can be used to support desired operations of the vehicle 100.

The underwater vehicle 100 may further include one or more ballasts 108a-108b, which help to control the center of gravity of the vehicle 100. As described in more detail below, material can move within a power supply or other portion of the vehicle 100, and that movement can alter the center of gravity of the vehicle 100. Underwater gliders can be particularly susceptible to changes in their centers of gravity, so the vehicle 100 can adjust one or more of the ballasts 108a-108b as needed or desired (such as during ascent or descent) to maintain the center of gravity of the vehicle 100 substantially at a desired location. Each ballast 108a-108b includes any suitable structure configured to modify the center of gravity of an underwater vehicle. Note that the number and positions of the ballasts 108a-108b shown here are examples only, and any number and positions of ballasts can be used in the vehicle 100.

One or both ends of the vehicle 100 include a solar collector 110. Each solar collector 110 can be used to collect solar thermal energy when the vehicle 100 is at or near the surface of a body of water during daylight hours. As described in more detail below, the thermal energy collected by the solar collector 110 is used to facilitate power generation by a power supply within the vehicle 100. For example, the thermal energy collected by the solar collector 110 can be used to heat carbon dioxide or other refrigerant in one tank, and the refrigerant is used to generate power when transferred to another tank. The thermal energy collected by the solar collector 110 can help to increase the temperature or pressure of the refrigerant in the tank containing the bulk of the refrigerant and thereby facilitate easier or more rapid transfer of the refrigerant to the other tank.

Conversely, each solar collector 110 can be used to radiate thermal energy when the vehicle 100 is at or near the surface of a body of water during nighttime hours. As described in more detail below, thermal energy can be radiated from a tank not containing the bulk of the refrigerant in the power supply within the vehicle 100 in order to cool that tank. Cooling that tank lowers a temperature or pressure within that tank, which can help to facilitate easier or more rapid transfer of the refrigerant to that tank.

Note that, depending on the implementation, a solar collector 110 need not be used to perform both heating and cooling of tanks. In some embodiments, a solar collector 110 can be used to perform one of these functions but not the other. Each solar collector 110 includes any suitable structure configured to collect solar thermal energy and/or to radiate thermal energy. In particular embodiments, each solar collector 110 includes multiple smaller evacuated tubes within a larger evacuated tube, where each smaller evacuated tube includes a blackbody absorber with a thermal conductive finger extending into a tank, water jacket, or other portion of the vehicle's power supply. Note, however, that any other suitable solar collectors or thermal radiators can be used here.

Figure 1C:
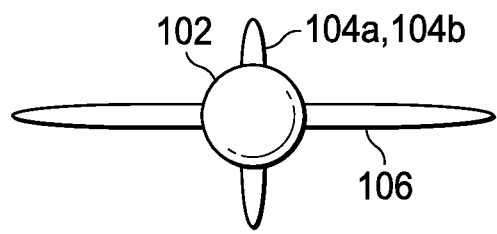
Figure 1D:
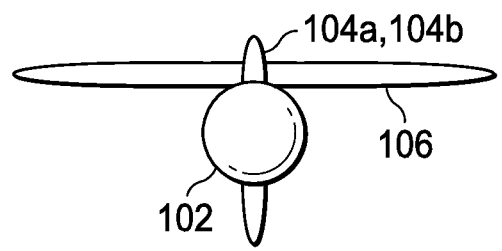

FIGS. 1C and 1D illustrate different possible end views of the underwater vehicle 100. In FIG. 1C, the wings 106 are positioned and extend from the body 102 along a line through a center of the body 102. In FIG. 1D, the wings 106 are positioned and extend from the body 102 along a line tangential to the body 102. In either case, the wings 106 can be stowed in a folded position where the wings 106 extend along the length of the body 102 and later unfolded before, during, or after deployment.

Figure 2A:
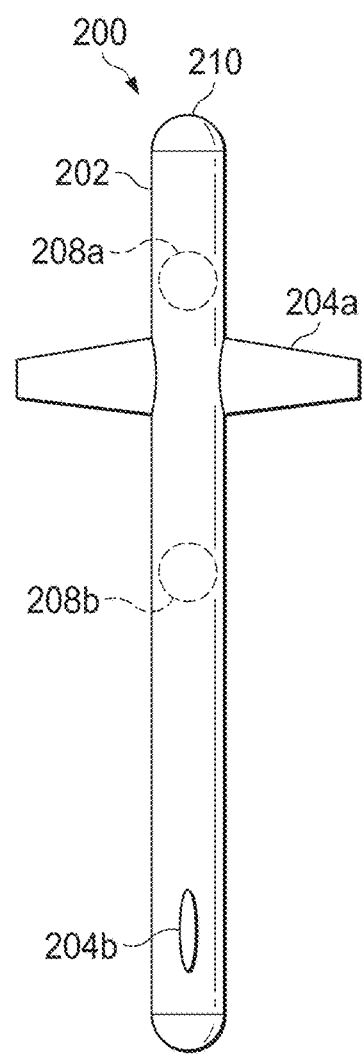
FIGS. 2A through 2C illustrate a second example underwater vehicle that augments power generation based on thermal energy conversion using solar or radiated thermal energy in accordance with this disclosure.
Figure 2B:
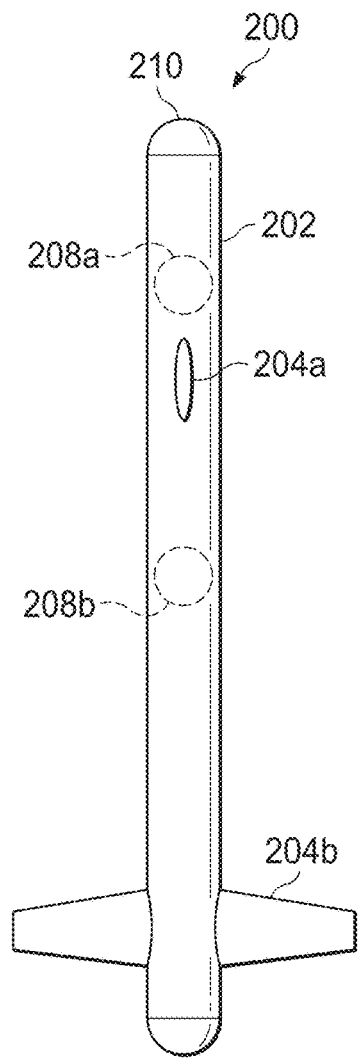
Figure 2C:
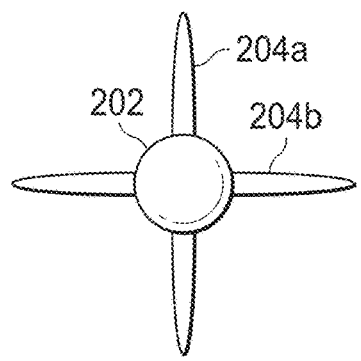

FIGS. 2A through 2C illustrate a second example underwater vehicle 200 that augments power generation based on thermal energy conversion using solar or radiated thermal energy in accordance with this disclosure. In this example, the vehicle 200 represents an unmanned underwater vehicle or other device that can function as a buoy within an ocean or other body of water. The vehicle 200 can be used to support various functions, such as undersea surveying, recovery, or surveillance operations.

As shown in FIGS. 2A through 2C, the underwater vehicle 200 includes a body 202 and fins 204a-204b. The body 202 represents any suitable structure configured to encase, protect, or otherwise contain other components of the vehicle 200. The body 202 can be formed from any suitable material(s) and in any suitable manner. The fins 204a-204b represent projections from the body 202 that help to stabilize the body 202 during travel. Each of the fins 204a-204b can be formed from any suitable material(s) and in any suitable manner. Also, each of the fins 204a-204b can have any suitable size, shape, and dimensions. Further, at least some of the fins 204a-204b can be movable or adjustable to help alter the course of the body 202 and to steer the body 102 through water during travel. In addition, the numbers and positions of the fins 204a-204b shown here are examples only, and any numbers and positions of fins can be used to support desired operations of the vehicle 200. The vehicle 200 may further include one or more ballasts 208a-208b, which help to control the center of gravity of the vehicle 200.

As can be seen in FIGS. 2A through 2C, the underwater vehicle 200 lacks wings used to support gliding of the vehicle 200 through water. As a result, the vehicle 200 represents a device that can function as a buoy but generally not as a glider within an ocean or other body of water.

One or both ends of the vehicle 200 include a solar collector 210. Each solar collector 210 can be used to collect solar thermal energy when the vehicle 200 is at or near the surface of a body of water during daylight hours. The thermal energy collected by the solar collector 210 can be used to heat carbon dioxide or other refrigerant in one tank of a power supply within the vehicle 200, and the refrigerant is used to generate power when transferred to another tank. The thermal energy collected by the solar collector 210 can help to increase the temperature or pressure of the refrigerant in the tank containing the bulk of the refrigerant and thereby facilitate easier or more rapid transfer of the refrigerant to the other tank. Conversely, each solar collector 210 can be used to radiate thermal energy when the vehicle 200 is at or near the surface of a body of water during nighttime hours. Thermal energy can be radiated in order to cool the tank not containing the bulk of the refrigerant in the power supply within the vehicle 200. Cooling that tank lowers a temperature or pressure within that tank, which can help to facilitate easier or more rapid transfer of the refrigerant to that tank. Note that, depending on the implementation, a solar collector 210 need not be used to perform both heating and cooling of tanks and can be used to perform one of these functions but not the other.

In some embodiments, each underwater vehicle 100 or 200 shown in FIGS. 1A through 2C can remain generally vertical during normal operation. In this configuration, the vehicle 100 or 200 is generally operating as a buoy and can collect information or perform other tasks. Of course, exact vertical orientation is not required during operation of the vehicle 100 or 200. During movement up and down within a body of water, the vehicle 100 or 200 can travel through the water to the surface or to a desired depth of the water. While submerged, the vehicle 100 or 200 can perform operations such as capturing various sensor measurements or searching for anomalies. Periodic surfacing of the vehicle 100 or 200 may allow the vehicle 100 or 200 to (among other things) transmit and receive data, verify its current location, and perform operations needed for power generation (note that the term "periodic" and its derivatives do not require action at a specific interval but merely that an action occurs repeatedly, possibly although not necessarily at a specific interval). After each surfacing, the vehicle 100 or 200 can re-submerge and, if needed, travel at an angle to a desired depth. The angle of travel may be based on the current location of the vehicle 100 or 200 and its desired location, which may allow the vehicle 100 or 200 to operate continuously or near-continuously at a desired station.

The use of the solar collectors 110, 210 in the vehicles 100, 200 can provide various advantages depending on the implementation and vehicle use. For example, the power generation capabilities of the vehicles 100, 200 can depend on obtaining an adequate temperature or pressure difference between two tanks of refrigerant, and it may be more difficult in some areas for the vehicles 100, 200 to dive to a sufficient depth in order to obtain colder water and achieve the adequate temperature or pressure difference. This may be true, for example, at higher latitudes where there is less of a temperature difference between temperatures at lower dive depths and surface temperatures. By using solar or radiated thermal energy, the vehicles 100, 200 may be able to generate adequate power over a wider range of latitudes. Moreover, using solar or radiated thermal energy may allow the vehicles 100, 200 to generate more power at lower and mid latitudes. In addition, the ability to create a larger temperature or pressure difference using solar energy may reduce the need for the vehicles 100, 200 to dive to a lower depth in order to obtain colder water to support power generation. This can save quite a bit of time when operating the vehicles 100, 200 since a deep dive for power generation can take a number of hours. This can also reduce the amount of electrical power used by the vehicles 100, 200 since the propulsion systems of the vehicles 100, 200 are not used to perform the dives as often.

Although FIGS. 1A through 2C illustrate examples of underwater vehicles 100 and 200 that augment power generation based on thermal energy conversion using solar or radiated thermal energy, various changes may be made to FIGS. 1A through 2C. For example, these figures illustrate example underwater vehicles only, and the power generation systems with solar or radiative augmentation described in this patent document can be used in any other suitable device or system.

Figure 3:
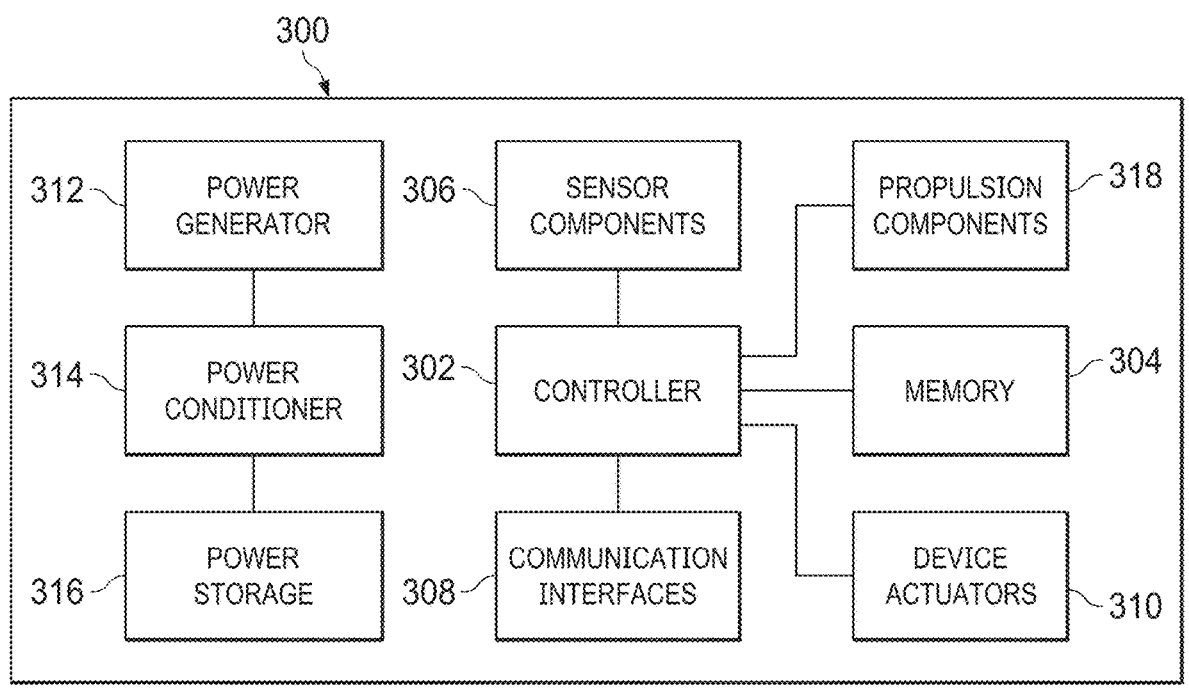
FIG. 3 illustrates example components of an underwater vehicle that augments power generation based on thermal energy conversion using solar or radiated thermal energy in accordance with this disclosure.

FIG. 3 illustrates example components of an underwater vehicle 300 that augments power generation based on thermal energy conversion using solar or radiated thermal energy in accordance with this disclosure. The underwater vehicle 300 can, for example, represent either of the underwater vehicles 100 and 200 described above. The components shown in FIG. 3 can therefore represent internal or other components within either of the vehicles 100 and 200 that were not shown in FIGS. 1A through 2C.

As shown in FIG. 3, the vehicle 300 includes at least one controller 302 and at least one memory 304. The controller 302 controls the overall operation of the vehicle 300 and can represent any suitable hardware or combination of hardware and software/firmware for controlling the vehicle 300. For example, the controller 302 can represent at least one processor configured to execute instructions obtained from the memory 304. The controller 302 may include any suitable number(s) and type(s) of processors or other computing or control devices in any suitable arrangement. Example types of controllers 302 include microprocessors, microcontrollers, digital signal processors, field programmable gate arrays, application specific integrated circuits, and discrete circuitry.

The memory 304 stores data used, generated, or collected by the controller 302 or other components of the vehicle 300. Each memory 304 represents any suitable structure(s) configured to store and facilitate retrieval of information (such as data, program code, and/or other suitable information on a temporary or permanent basis). Some examples of the memory 304 can include at least one random access memory, read only memory, Flash memory, or any other suitable volatile or non-volatile storage and retrieval device(s).

The vehicle 300 in this example also includes one or more sensor components 306, one or more communication interfaces 308, and one or more device actuators 310. The sensor components 306 include sensors that can be used to sense any suitable characteristics of the vehicle 300 itself or the environment around the vehicle 300. For example, the sensor components 306 can include a position sensor, such as a Global Positioning System (GPS) sensor, which can identify the position of the vehicle 300. This can be used, for instance, to help make sure that the vehicle 300 is following a desired path or is maintaining its position at or near a desired location. The sensor components 306 can also include audio sensors for capturing audio signals, photodetectors or other cameras for capturing video signals or photographs, or any other or additional components for capturing any other or additional information. Each sensor component 306 includes any suitable structure for sensing one or more characteristics.

The communication interfaces 308 support interactions between the vehicle 300 and other devices or systems. For example, the communication interfaces 308 can include at least one radio frequency (RF) or other transceiver configured to communicate with one or more satellites, airplanes, ships, or other nearby or distant devices. The communication interfaces 308 allow the vehicle 300 to transmit data to one or more external destinations, such as information associated with data collected by the sensor components 306. The communication interfaces 308 also allow the vehicle 300 to receive data from one or more external sources, such as instructions for other or additional operations to be performed by the vehicle 300 or instructions for controlling where the vehicle 300 operates. Each communication interface 308 includes any suitable structure(s) supporting communication with the vehicle 300.

The device actuators 310 are used to adjust one or more operational aspects of the vehicle 300. For example, the device actuators 310 can be used to move the fins 104a-104b, 204a-204b of the vehicle while the vehicle is ascending or descending. The device actuators 310 can also be used to control the positioning of the wings 106 to control whether the wings 106 are stowed or swept upward or downward (depending on the direction of travel). Each device actuator 310 includes any suitable structure for physically modifying one or more components of an underwater vehicle.

The vehicle 300 further includes a power generator 312, a power conditioner 314, and a power storage 316. The power generator 312 generally operates to create electrical energy. In particular, the power generator 312 can operate based on different water temperatures or water pressures that the vehicle 300 experiences over the course of its travel. As noted above and as described in more detail below, the power generator 312 can use solar thermal energy collected by a solar collector 110, 210 or can radiate thermal energy using a solar collector 110, 210 to improve the generation of power. The power generator 312 includes any suitable structure configured to generate electrical energy based on temperature or pressure.

The power conditioner 314 is configured to condition or convert the power generated by the power generator 312 into a suitable form for storage or use. For example, the power conditioner 314 can receive a direct current (DC) signal from the power generator 312, filter the DC signal, and store power in the power storage 316 based on the DC signal. The power conditioner 314 can also receive power from the power storage 316 and convert the power into suitable voltage(s) and current(s) for other components of the vehicle 300. The power conditioner 314 includes any suitable structure(s) for conditioning or converting electrical power.

The power storage 316 is used to store electrical power generated by the power generator 312 for later use. The power storage 316 represents any suitable structure(s) for storing electrical power, such as one or more batteries or super-capacitors.

The vehicle 300 further includes one or more propulsion components 318, which represent components used to physically move the vehicle 300 through water. The propulsion components 318 can represent one or more motors or other propulsion systems. In some embodiments, the propulsion components 318 can be used only when the vehicle 300 is traveling between a position at or near the surface and a desired depth. During other time periods, the propulsion components 318 can be deactivated. Of course, other embodiments can allow the propulsion components 318 to be used at other times, such as to help maintain the vehicle 300 at a desired location or to help move the propulsion components 318 to avoid observation or detection.

The power generated by the power generator 312 and the power stored in the power storage 316 can be supplied to any of the components in FIG. 3. For example, electrical power can be provided to the controller 302 and memory 304 to facilitate computations and instruction execution by the controller 302 and data storage/retrieval by the memory 304. Electrical power can also be provided to the sensor components 306, communication interfaces 308, and device actuators 310 in order to support sensing, communication, and actuation operations. In addition, electrical power can be provided to the propulsion components 318 in order to support movement of the vehicle 300.

Although FIG. 3 illustrates one example of components of an underwater vehicle 300 that augments power generation based on thermal energy conversion using solar or radiated thermal energy, various changes may be made to FIG. 3. For example, various components in FIG. 3 can be combined, further subdivided, rearranged, or omitted or additional components can be added according to particular needs.

FIGS. 4 through 7 illustrate an example solar collector 400 for collecting solar thermal energy and radiating thermal energy in accordance with this disclosure. The solar collector 400 can, for example, represent either of the solar collectors 110 and 210 in the underwater vehicles 100 and 200 described above and can be used as part of the power generator 312 in FIG. 3.

Figure 4:
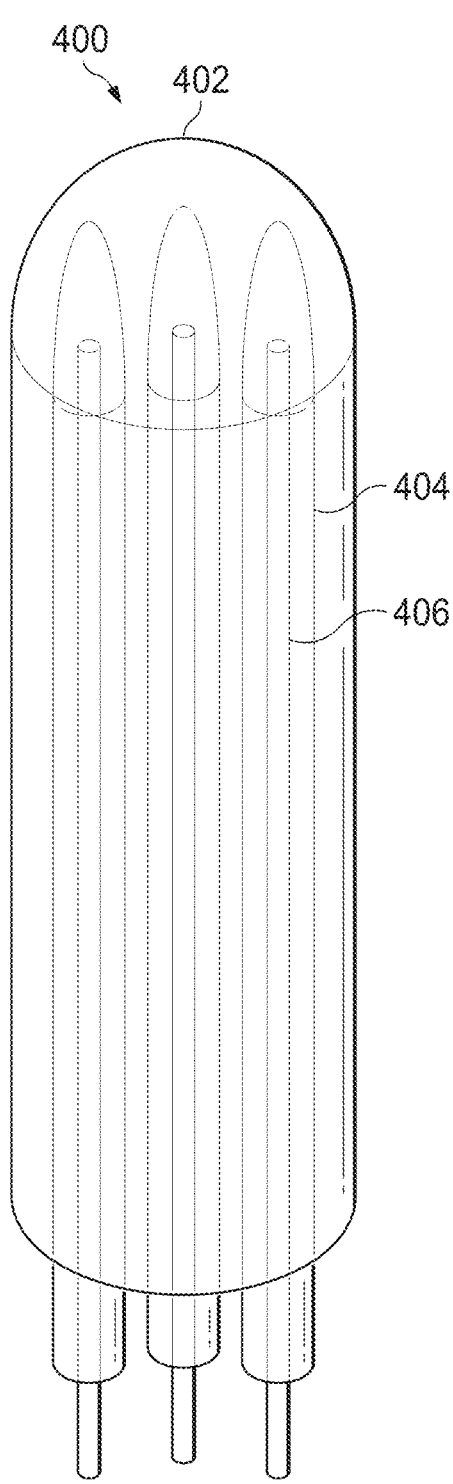
FIGS. 4 through 7 illustrate an example solar collector for collecting solar thermal energy and radiating thermal energy in accordance with this disclosure.

As shown in FIG. 4, the solar collector 400 includes a larger evacuated tube 402, which contains a number of smaller evacuated tubes 404. Each evacuated tube 402 and 404 represents a structure in which all or substantially all air has been removed to form a vacuum. Each evacuated tube 402 and 404 can be formed from any suitable material(s) and in any suitable manner. In some embodiments, each evacuated tube 402 and 404 can be formed from glass, plastic, or other material(s) substantially transparent to sunlight and resistant to elevated pressures found at deep depths.

Each of the smaller evacuated tubes 404 includes a blackbody absorber 406. Each blackbody absorber 406 is configured to absorb and transport solar thermal energy. For example, the thermal energy can be transported into a heat pipe, which then transports the thermal energy to the power generation system of an underwater vehicle. Each blackbody absorber 406 generally represents a structure having a darker color (such as black) and that collects solar thermal energy. As noted above, it is also possible (such as during nighttime hours when it is dark) for the blackbody absorbers 406 to radiate thermal energy from the power generation system of the underwater vehicle.

Figure 5:
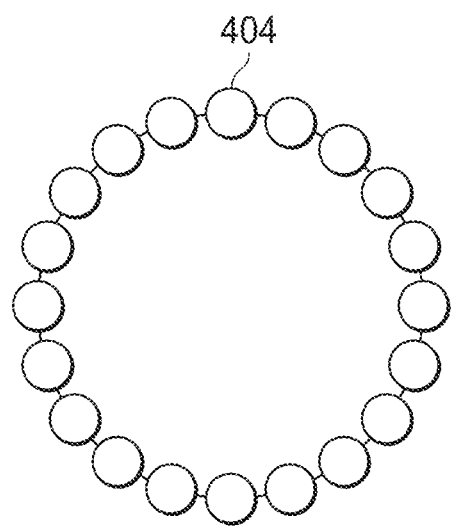
Figure 6:
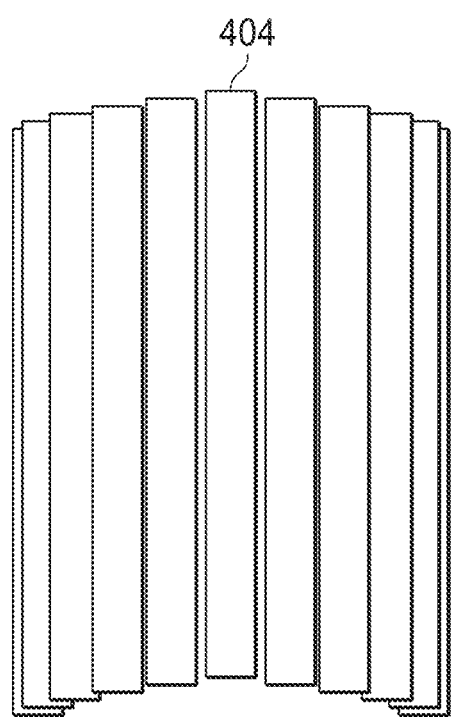

FIGS. 5 and 6 illustrate an example arrangement of the smaller evacuated tubes 404 within the larger evacuated tube 402. In particular, FIG. 5 illustrates a top view of the evacuated tubes 404, and FIG. 6 illustrates a side view of the evacuated tubes 404. As shown here, the evacuated tubes 404 are arranged in a ring. This type of arrangement can help to facilitate collection of solar thermal energy in an unstabilized (moving) vehicle through non-directional charging. Note, however, that other arrangements of the evacuated tubes 404 can also be used.

Figure 7:
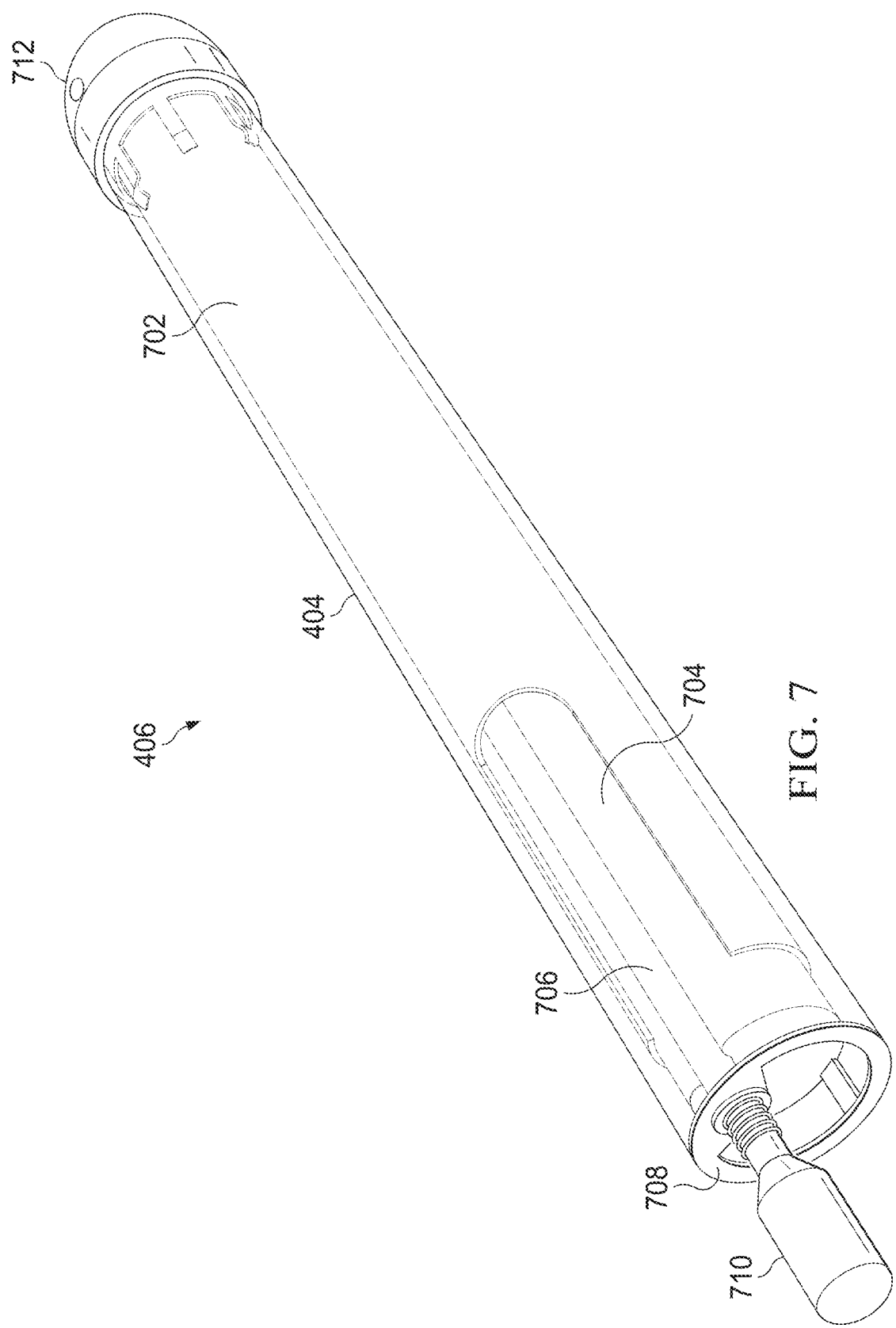

FIG. 7 illustrates an example blackbody absorber 406 within an evacuated tube 404. As shown in FIG. 7, an absorber coating 702 is formed within the evacuated tube 404. The absorber coating 702 can be formed directly on an inner surface of the evacuated tube 404, or the absorber coating 702 can be placed on a separate structure within the evacuated tube 404. Any suitable coating can be used to absorb solar thermal energy.

A heat transfer fin 704 within the evacuated tube 404 transfers solar thermal energy collected by the absorber coating 702 into a heat pipe 706 (or transfers thermal energy from the heat pipe 706 when radiating thermal energy). The heat transfer fin 704 includes any suitable structure physically or thermally coupled to a heat pipe. The heat pipe 706 includes any suitable structure for transferring thermal energy, such as a metal rod. A top plate and spring 708 help to secure the heat pipe 706 to the heat transfer fin 704 in order to facilitate the transfer of thermal energy to and from the heat pipe 706.

The heat pipe 706 here terminates in a bulb 710, which represents a portion of the heat pipe having a larger surface area. As described below, the bulb 710 can be positioned within a refrigerant tank or a water jacket surrounding a refrigerant tank in order to transfer thermal energy into (or receive thermal energy from) a refrigerant in the refrigerant tank. Note that the bulb 710 can have any suitable size, shape, and dimensions.

A cap 712 is secured to an end of the evacuated tube 404. The cap 712 can help to protect an end of the evacuated tube 404 or allow access to the tube 404 when removed. The cap 712 can be formed from any suitable material(s), such as rubber.

Although FIGS. 4 through 7 illustrate one example of a solar collector for collecting solar thermal energy and radiating thermal energy, various changes may be made to FIGS. 4 through 7. For example, the solar collector 400 here represents one potential structure that can be used to collect solar thermal energy or radiate thermal energy. A wide variety of other structures can also be used to collect solar thermal energy or radiate thermal energy.

Figure 8:
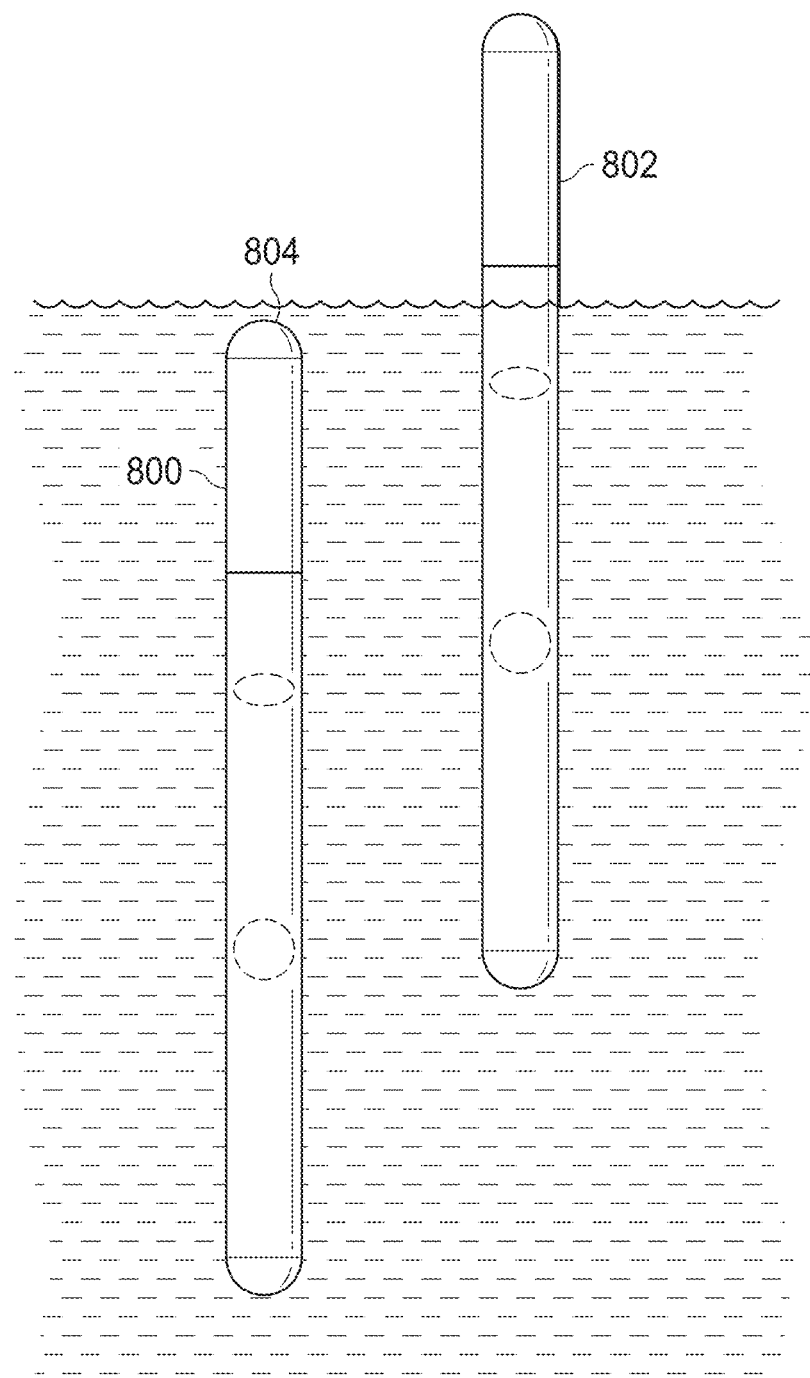
FIG. 8 illustrates example uses of an underwater vehicle for collecting solar thermal energy and radiating thermal energy in accordance with this disclosure.

FIG. 8 illustrates example uses of an underwater vehicle 800 for collecting solar thermal energy and radiating thermal energy in accordance with this disclosure. Note that while the underwater vehicle 800 in FIG. 8 is similar to the buoy described above, the underwater vehicle 800 in FIG. 8 can represent any suitable underwater vehicle that augments power generation based on thermal energy conversion using solar or radiated thermal energy, including any of those described above.

As shown in FIG. 8, the underwater vehicle 800 can assume one of multiple locations when at or near the surface of a body of water. For example, in position 802, the underwater vehicle 800 has breached the water's surface, and one end of the underwater vehicle 800 is extending above the water. In this position, a solar collector of the underwater vehicle 800 can capture a large amount of solar thermal energy or radiate a large amount of thermal energy, depending on various factors (such as the time of day or the temperature of the air above the body of water).

In position 804, the underwater vehicle 800 has not breached the water's surface, and one end of the underwater vehicle 800 remains near (but does not extend above) the water's surface. In this position, a solar collector of the underwater vehicle 800 can still obtain a large amount of solar thermal energy or radiate a large amount of thermal energy, depending on various factors (such as the time of day or the temperature of the water near the surface). The amount of thermal energy collected or radiated in this manner can be less than when in the position 802, but the underwater vehicle 800 may remain hidden to a better extent when it does not breach the water's surface.

Although FIG. 8 illustrates example uses of an underwater vehicle 800 for collecting solar thermal energy and radiating thermal energy, various changes may be made to FIG. 8. For example, an underwater vehicle can be used in any other suitable manner. As a particular example, as noted above, both ends of an underwater vehicle can include solar collectors. In such an embodiment, the underwater vehicle can rotate to change orientation so that different solar collectors are positioned above or near the water's surface.

Figure 9:
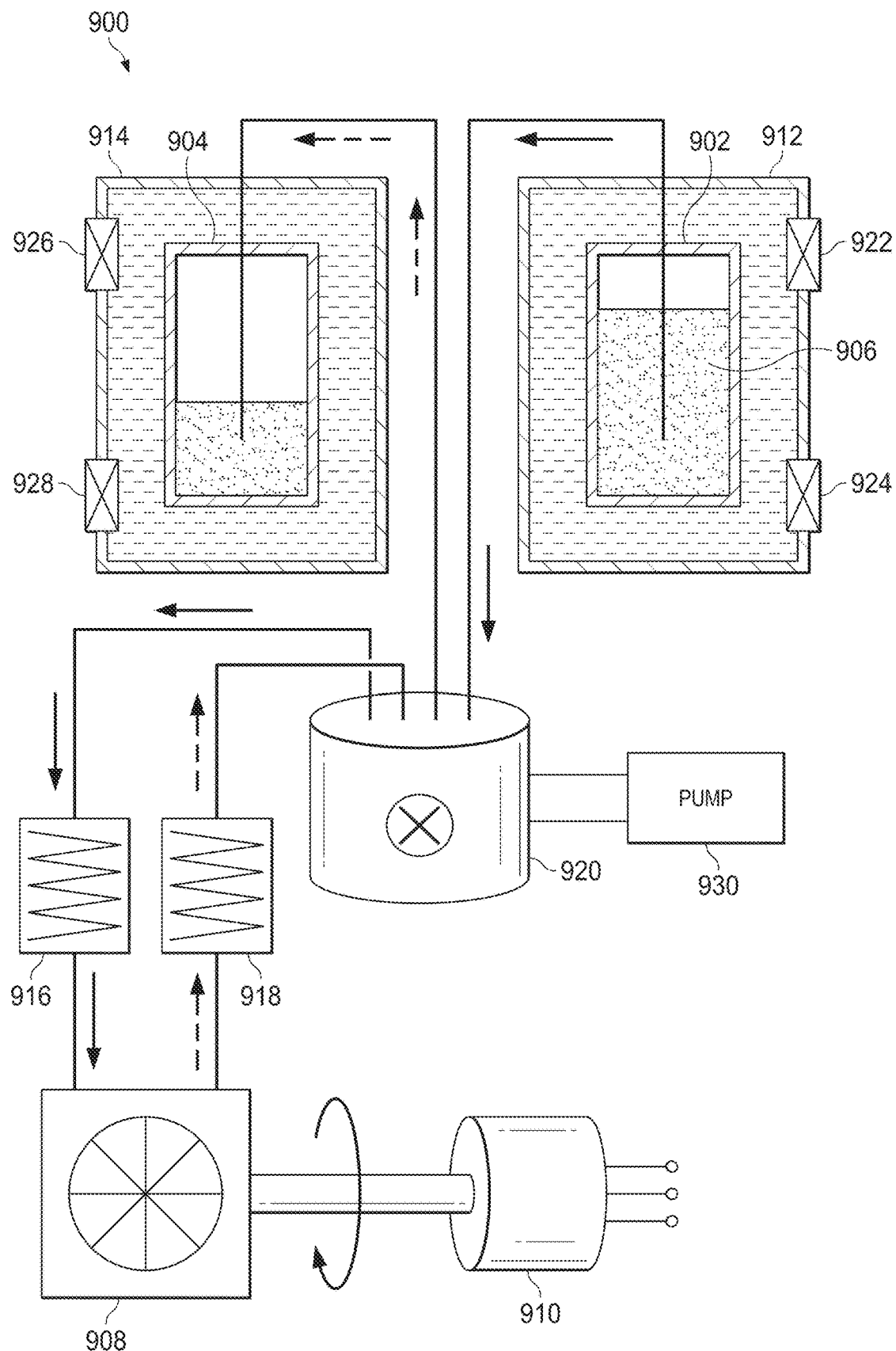
FIGS. 9 and 10 illustrate example power generation systems that can be augmented using solar or radiated thermal energy in accordance with this disclosure.
Figure 10:
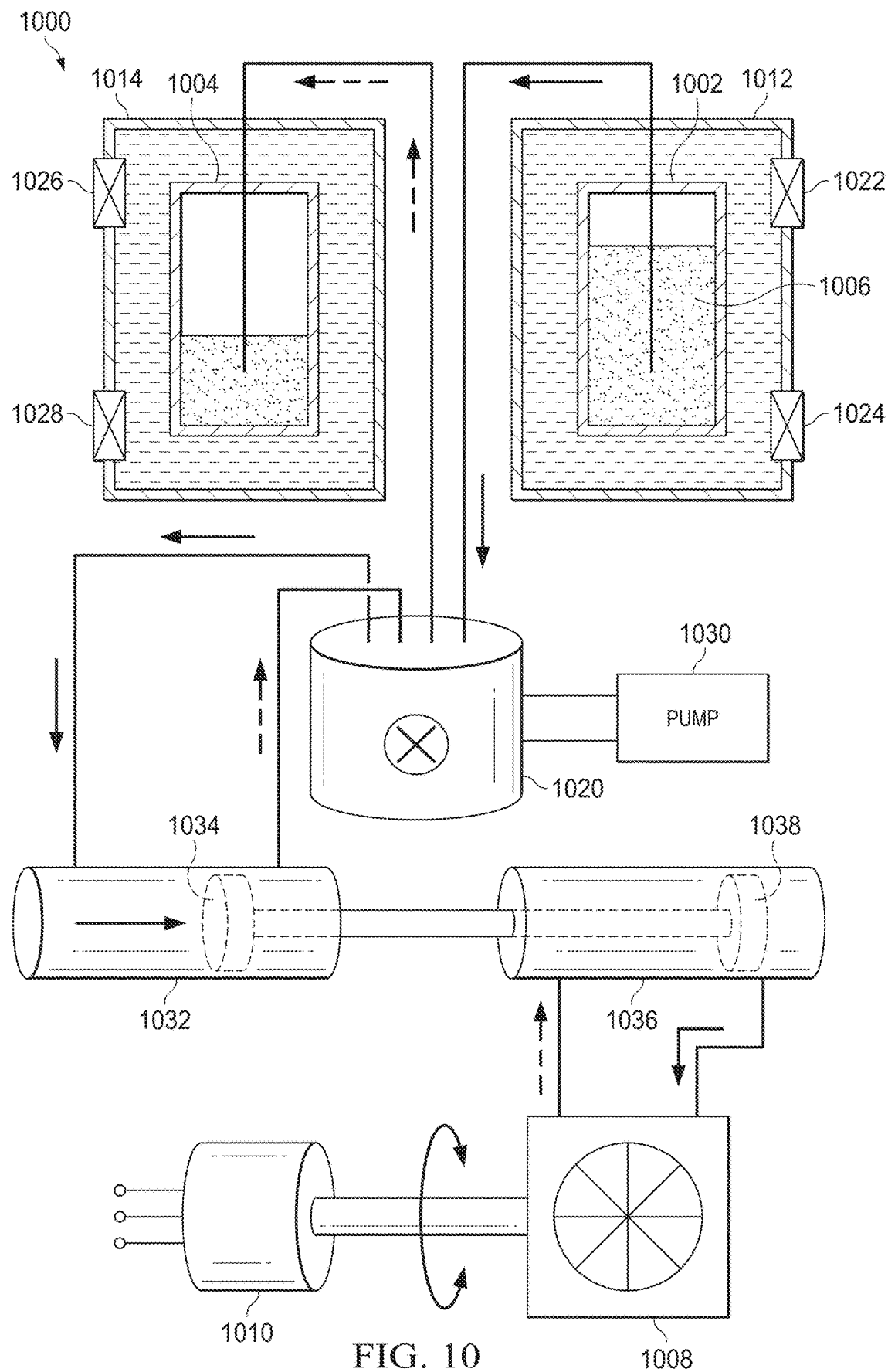

FIGS. 9 and 10 illustrate example power generation systems 900, 1000 that can be augmented using solar or radiated thermal energy in accordance with this disclosure. In particular, the power generation systems 900, 1000 operate by creating a flow of refrigerant between tanks, and the refrigerant flow is used to generate electrical power.

As shown in FIG. 9, the power generation system 900 generally employs a Carnot-Brayton cycle involving two tanks 902 and 904. A refrigerant 906 is transferred from one tank 902 to the other tank 904 and passes through a turbine 908, which turns a generator 910 to generate electrical power. Each tank 902 or 904 is configured to hold the refrigerant 906 under pressure.

Each tank 902 and 904 includes any suitable structure configured to hold a refrigerant under pressure. The refrigerant 906 includes any suitable fluid used to transfer heat between tanks, such as gaseous or liquid carbon dioxide. The turbine 908 includes any suitable structure configured to turn in response to a refrigerant flow. The generator 910 includes any suitable structure for generating electrical energy, such as a Pelton turbine or a brushless DC (BLDC) generator.

The power generation system 900 can also include multiple insulated water jackets 912 and 914. Each insulated water jacket 912 and 914 receives and retains warmer or colder water in order to facilitate movement of the refrigerant 906 between the tanks 902 and 904. For example, the tank 902 containing more refrigerant 906 in FIG. 9 can be surrounded by warmer water, increasing the pressure in that tank. Conversely, the tank 904 containing less refrigerant 906 in FIG. 9 can be surrounded by colder water, lowering the pressure in that tank. The pressure difference can be used to facilitate easier or more effective refrigerant transport between the tanks 902 and 904. Each insulated water jacket 912 and 914 includes any suitable insulated structure configured to receive and retain water. The insulated water jackets 912 and 914 need not be pressurized and can be unpressurized containers.

Thermal energy from a solar collector 110, 210, 400 can be transported into the tank 902 directly and/or into the water jacket 912 surrounding the tank 902. In some embodiments, this can be achieved by placing the bulbs 710 of the heat pipes 706 (or other portions of the heat pipes) inside the tank 902 and/or inside the water jacket 912. Thermal energy received by the heat pipes 706 can then be released into the refrigerant 906 or into the water in the water jacket 912 and then into the refrigerant 906. When the solar collector 110, 210, 400 is not generating thermal energy (such as at night), heat from the tank 902 or water jacket 912 can be transported through the heat pipes 706 and radiated into an ambient environment, which provides cooling for the tank 902 and the refrigerant 906 in the tank 902. Optionally, a solar collector 110, 210, 400 can be used with the tank 904 and/or the water jacket 914 surrounding the tank 904. Depending on the implementation, one or more solar collectors can be used with one or both of the tanks 902 and 904, and the solar collector(s) can be used to collect thermal energy or radiate thermal energy based on the time of day, weather, air temperature, water temperature, or other factors.

To facilitate power generation, two heat exchangers 916 and 918 can be used with the turbine 908. The heat exchanger 916 can function as an evaporator to heat the refrigerant 906 into vapor before the vapor passes through the turbine 908. The heat exchanger 918 can function as a condenser to cool the vapor into liquid refrigerant 906 after the vapor passes through the turbine 908. Each heat exchanger 916 and 918 includes any suitable structure for passing heat to or receiving heat from a refrigerant flow. Although not shown here, water jackets can be used to surround the heat exchangers 916 and 918 with water in order to facilitate these operations. For instance, the heat exchanger 916 can be surrounded by warmer water to help convert liquid refrigerant 906 into vapor, and the heat exchanger 918 can be surrounded by colder water to help condense the vapor into liquid refrigerant 906.

A valve assembly 920 allows selective connection of various components in FIG. 9 to control the flow of refrigerant 906 in the system 900. In FIG. 9, for example, the large arrows with solid lines represent the transport of refrigerant 906 from the tank 902 to the turbine 908 through the valve assembly 920, and the large arrows with dashed lines represent the transport of refrigerant 906 from the turbine 908 to the tank 904 through the valve assembly 920. If needed or desired, the valve assembly 920 can change the refrigerant flow, such as to reverse the process. The valve assembly 920 includes any suitable structure for selectively controlling refrigerant flow, such as a crossover valve assembly.

Additional valves 922-928 are included in the insulated water jackets 912 and 914 to control the flow of fresh water into and out of the insulated water jackets 912 and 914. For example, the valves 922 and 924 can be used to allow warmer water to enter the water jacket 912, and the valves 926 and 928 can be used to allow colder water to enter the water jacket 914 (or vice versa). Although not shown, pumps or other mechanisms can be used to help pull water into or push water out of the insulated water jackets 912 and 914. Also, although not shown, a water brake ram can be used to slow a vehicle's ascent or descent using water contained in the water jacket to be flushed. Each valve 922-928 represents any suitable structure for controlling the flow of water into or out of an insulated water jacket.

The various valves 920-928 shown in FIG. 9 can be controlled in any suitable manner. For example, in some embodiments, the controller 302 of an underwater vehicle 300 can control the valves 920-928 as part of the overall control of the vehicle 300.

Note that FIG. 9 shows one phase of a power generation cycle in which the refrigerant 906 is transferred from the tank 902 to the tank 904. Another phase of the power generation cycle involves the refrigerant 906 being transferred from the tank 904 back to the tank 902. This other phase of the power generation cycle may or may not involve passing the refrigerant 906 through the turbine 908, so power may or may not be generated during this other phase.

Various approaches can be used to transfer the refrigerant 906 from the tank 904 back to the tank 902. In some embodiments, the tank 904 can be physically positioned above the tank 902, and the valve assembly 920 or another valve (not shown) can couple the tanks 902-904 directly to one another. Gravity can then be used to allow the refrigerant 906 to flow from the tank 904 into the tank 902. Note that prior to this operation, the water in the water jacket 912 can be flushed and replaced with colder water and/or the water in the water jacket 914 can be flushed and replaced with warmer water (or warmed via solar thermal energy collection). This helps to reduce the temperature/pressure differential between the tanks 902-904 or to reverse the temperature/pressure differential between the tanks 902-904.

In other embodiments, a pump 930 can be used to pump the liquid refrigerant 906 from the tank 904 into the tank 902, such as via appropriate configuration of the valve assembly 920. The pump 930 can also be coupled directly to the tanks 902-904, so no configuration of the valve assembly 920 would be needed there.

In yet other embodiments, a solar collector can be provided for each tank 902-904, and the same process shown in FIG. 9 can be reversed to force the warmer refrigerant from the tank 904 into the tank 902. To support this, the water jacket 912 can be used to collect colder water, and the water jacket 914 can be used to collect warmer water (which can be warmed using solar thermal energy). Various other components in FIG. 9 (such as the heat exchangers) can be replicated to support proper evaporation/condensation of the refrigerant 906 flowing from the tank 904 to the tank 902. Alternatively, the valve assembly 920 can allow refrigerant flow through the heat exchangers 916 and 918 in the same direction regardless of whether the refrigerant 906 is entering or exiting the tank 902.

Note that these represent example ways in which the refrigerant 906 can be transferred from the tank 904 to the tank 902 so that another power generation cycle can occur. Any other suitable technique can be used to transfer the refrigerant 906 from the tank 904 to the tank 902.

As shown in FIG. 10, the power generation system 1000 contains many similar components as the power generation system 900. For example, the power generation system 1000 includes tanks 1002 and 1004, a refrigerant 1006, a turbine 1008, and a generator 1010. The power generation system 1000 also includes water jackets 1012 and 1014, a valve assembly 1020, valves 1022-1028, and an optional pump 1030. These components may be the same as or similar to the corresponding components in FIG. 9.

Thermal energy from a solar collector 110, 210, 400 can be transported into the tank 1002 directly and/or into the water jacket 1012 surrounding the tank 1002. In some embodiments, this can be achieved by placing the bulbs 710 of the heat pipes 706 (or other portions of the heat pipes) inside the tank 1002 and/or inside the water jacket 1012. Thermal energy received by the heat pipes 706 can then be released into the refrigerant 1006 or into the water in the water jacket 1012 and then into the refrigerant 1006. When the solar collector 110, 210, 400 is not generating thermal energy (such as at night), heat from the tank 1002 or water jacket 1012 can be transported through the heat pipes 706 and radiated into an ambient environment, which provides cooling for the tank 1002 and the refrigerant 1006 in the tank 1002. Optionally, a solar collector 110, 210, 400 can be used with the tank 1004 and/or the water jacket 1014 surrounding the tank 1004. Depending on the implementation, one or more solar collectors can be used with one or both of the tanks 1002 and 1004, and the solar collector(s) can be used to collect thermal energy or radiate thermal energy based on the time of day, weather, air temperature, water temperature, or other factors.

In FIG. 10, the turbine 1008 is not driven directly by the refrigerant 1006. Rather, the refrigerant 1006 flows through a cylinder 1032 and causes a piston 1034 in the cylinder 1032 to move. A hydraulic cylinder 1036 is filled with a hydraulic fluid and includes a piston 1038 that is connected to the piston 1034. Movement of the piston 1034 therefore causes a corresponding movement of the piston 1038.

When the piston 1034 moves left to right in FIG. 10, the piston 1038 also moves left to right and pushes hydraulic fluid clockwise through the turbine 1008. When the piston 1034 moves right to left in FIG. 10, the piston 1038 also moves right to left and pushes hydraulic fluid counterclockwise through the turbine 1008. In either case, the turbine 1008 turns, causing the generator 1010 to generate electrical power. The valve assembly 1020 can be used here to change the direction of refrigerant flow through the cylinder 1032, thereby controlling the direction of hydraulic fluid flow through the cylinder 1036. While described as cylinders, elements 1032 and 1036 in FIG. 10 can have any other suitable size, shape, and dimensions. Also, each piston 1034 and 1038 can have any suitable size, shape, and dimensions.

Note that FIG. 10 shows one phase of a power generation cycle in which the refrigerant 1006 is transferred from the tank 1002 to the tank 1004. Another phase of the power generation cycle involves the refrigerant 1006 being transferred from the tank 1004 back to the tank 1002. This phase may or may not involve moving the pistons 1034 and 1038, so power may or may not be generated during this other phase.

As described above, various approaches can be used to transfer the refrigerant 1006 from the tank 1004 back to the tank 1002. In some embodiments, the tank 1004 can be physically positioned above the tank 1002, and the valve assembly 1020 or another valve (not shown) can couple the tanks 1002-1004 directly to one another so that gravity causes the refrigerant 1006 to flow from the tank 1004 into the tank 1002. The water in the water jackets 1012 and 1014 can be changed as needed to support this transfer. In other embodiments, the pump 1030 can be used to pump the liquid refrigerant 1006 from the tank 1004 into the tank 1002, such as via appropriate configuration of the valve assembly 1020 or through direct connections to the tanks. In either case, after the bulk of the refrigerant 1006 is in the tank 1002, another power generation cycle occurs, but during this cycle the valve assembly 1020 reverses the refrigerant flow through the cylinder 1032 so that the piston 1034 moves in the opposite direction. Thus, in each power generation cycle, the piston 1034 moves left to right or right to left (but not both).

In yet other embodiments, a solar collector can be provided for each tank 1002-1004, and the same process shown in FIG. 10 can be reversed to force the warmer refrigerant from the tank 1004 into the tank 1002. During the flow of refrigerant 1006 from the tank 1004 to the tank 1002, the valve assembly 1020 reverses the refrigerant flow through the cylinder 1032 so that the piston 1034 moves in the opposite direction. After the bulk of the refrigerant 1006 is in the tank 1002, another power generation cycle occurs. Thus, in each power generation cycle, the piston 1034 moves both left to right and right to left in FIG. 10.

Note that these represent example ways in which the refrigerant 1006 can be transferred from the tank 1004 to the tank 1002 so that another power generation cycle can occur. Any other suitable technique can be used to transfer the refrigerant 1006 from the tank 1004 to the tank 1002.

Although FIGS. 9 and 10 illustrate examples of power generation systems 900 and 1000 that can be augmented using solar or radiated thermal energy, various changes may be made to FIGS. 9 and 10. For example, various components in each figure can be combined, further subdivided, rearranged, or omitted or additional components can be added according to particular needs. Also, shapes, sizes, and dimensions of various components in these figures can vary as needed or desired.

FIGS. 11 and 12 illustrate example methods for augmenting power generation based on thermal energy conversion using solar or radiated thermal energy in accordance with this disclosure. In particular, FIG. 11 illustrates an example method 1100 for augmenting power generation using solar thermal energy, and FIG. 12 illustrates an example method 1200 for augmenting power generation using radiated thermal energy. For ease of explanation, the methods 1100 and 1200 are described as involving any of the underwater vehicles 100, 200, 300, 800 using the solar collector 400 and either of the power generation systems 900, 1000. However, the methods 1100 and 1200 could be used with any suitable vehicle, solar collector, or power generation system.

As shown in FIG. 11, solar thermal energy is collected using at least one solar collector at step 1102, and refrigerant in a first tank is warmed using the collected solar thermal energy at step 1104. This can include, for example, one or more blackbody absorbers 406 in a solar collector 110, 210, 400 receiving thermal energy from sunlight. This can also include one or more heat pipes 706 transporting the received thermal energy from the blackbody absorbers 406 into the tank 902, 1002 or into the water jacket 912, 1012 around the tank 902, 1002. This transfers thermal energy into the refrigerant 906, 1006 in the tank 902, 1002, which increases the temperature or pressure within the tank 902, 1002. Optionally, warmer water can be captured in the water jacket 912, 1012 around the tank 902, 1002 to further warm the refrigerant 906, 1006 in the tank 902, 1002.

A second tank is cooled at step 1106. This can include, for example, capturing colder water in the water jacket 914, 1014 around the tank 904, 1004. This decreases the temperature or pressure within the tank 904, 1004. Ideally, at least some minimum temperature differential or pressure differential is achieved by the warming and the cooling of the tanks in this manner.

The refrigerant is transferred from the first tank to the second tank at step 1108, and electrical energy is created based on the refrigerant flow at step 1110. This can include, for example, the refrigerant 906 flowing from the tank 902 to the tank 904 through the turbine 908, causing the generator 910 to generate electrical energy. Alternatively, this can include the refrigerant 1006 flowing from the tank 1002 to the tank 1004 through the cylinder 1032, which causes movement of the piston 1038 and causes the generator 1010 to generate electrical energy. Of course, the flow of refrigerant can be used to generate electrical energy in any other suitable manner. Eventually, the transfer of refrigerant from the first tank to the second tank is completed at step 1112, which ends this phase of a power generation cycle. Note that some refrigerant may remain in the first tank, but ideally the bulk of the refrigerant has been transferred to the second tank.

At this point, the next phase of the power generation cycle can occur to transfer the refrigerant from the second tank back to the first tank at step 1114. This can include, for example, transferring the refrigerant 906, 1006 from the tank 904, 1004 to the tank 902, 1002 with or without generating electrical energy. As described above, various approaches can be used to transfer the refrigerant 906, 1006 from the tank 904, 1004 back to the tank 902, 1002 (which may or may not involve additional power generation). Water in the water jackets 912, 914, 1012, 1014 can also be changed to support this movement of the refrigerant 906, 1006.

As shown in FIG. 12, refrigerant in a first tank is warmed at step 1202. This can include, for example, capturing warmer water in the water jacket 912, 1012 around the tank 902, 1002. This transfers thermal energy into the refrigerant 906, 1006, which increases the temperature or pressure within the tank 902, 1002.

Thermal energy associated with a second tank is radiated at step 1204, and the second tank is cooled based on the radiation of the thermal energy at step 1206. This can include, for example, one or more heat pipes 706 transporting thermal energy from the tank 904, 1004 or the water jacket 914, 1014 to one or more blackbody absorbers 406 in a solar collector 110, 210, 400. This can also include the one or more blackbody absorbers 406 radiating the thermal energy into an ambient environment. This removes thermal energy from the refrigerant 906, 1006 in the tank 904, 1004, which decreases the temperature or pressure within the tank 904, 1004. Optionally, colder water can be captured in the water jacket 914, 1014 around the tank 904, 1004 to further cool the tank 904, 1004.

The refrigerant is transferred from the first tank to the second tank at step 1208, and electrical energy is created based on the refrigerant flow at step 1210. This can include, for example, the refrigerant 906 flowing from the tank 902 to the tank 904 through the turbine 908, causing the generator 910 to generate electrical energy. Alternatively, this can include the refrigerant 1006 flowing from the tank 1002 to the tank 1004 through the cylinder 1032, which causes movement of the piston 1038 and causes the generator 1010 to generate electrical energy. Of course, the flow of refrigerant can be used to generate electrical energy in any other suitable manner. Eventually, the transfer of refrigerant from the first tank to the second tank is completed at step 1212, which ends this phase of a power generation cycle. Note that some refrigerant may remain in the first tank, but ideally the bulk of the refrigerant has been transferred to the second tank.

At this point, the next phase of the power generation cycle can occur to transfer the refrigerant from the second tank back to the first tank at step 1214. This can include, for example, transferring the refrigerant 906, 1006 from the tank 904, 1004 to the tank 902, 1002 with or without generating electrical energy. As described above, various approaches can be used to transfer the refrigerant 906, 1006 from the tank 904, 1004 back to the tank 902, 1002 (which may or may not involve additional power generation). Water in the water jackets 912, 914, 1012, 1014 can also be changed to support this movement of the refrigerant 906, 1006.

Although FIGS. 11 and 12 illustrate examples of methods for augmenting power generation based on thermal energy conversion using solar or radiated thermal energy, various changes may be made to FIGS. 11 and 12. For example, while each figure shows a series of steps, various steps in each figure can overlap, occur in parallel, occur in a different order, or occur any number of times. As particular examples, step 1106 can occur before steps 1102-1104, or step 1202 can occur after steps 1204-1206. Also, an underwater vehicle or other device can implement both methods 1100 and 1200, such as by switching its operational mode depending on the time of day, weather, water temperature, or air temperature to use the appropriate method.

It should be noted that while various power generation systems and methods are described above as being used to power an underwater vehicle, the power generation systems and methods can be used in other ways. For example, the power generation systems and methods can be used to charge power carriers, such as those described in U.S. patent application Ser. No. 15/264,399 filed on Sep. 13, 2016 (which is hereby incorporated by reference in its entirety). The power carriers can then be used in any suitable manner, such as to power underwater vehicles or provide electricity to other devices or systems. With an adequate number of power generation systems (and optionally an adequate number of power carriers), a large amount of power can be made available for use.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the scope of this disclosure, as defined by the following claims.

What is claimed is:

1. An apparatus comprising:
   first and second tanks each configured to receive and store a refrigerant under pressure;
   at least one generator configured to generate electrical power based on a flow of the refrigerant between the tanks; and
   a collector configured to at least one of:
      transfer solar thermal energy to one of the tanks to heat the refrigerant in that tank; and
      radiate thermal energy from one of the tanks into an ambient environment to cool the refrigerant in that tank;
   wherein the collector comprises:
      a larger evacuated tube;
      multiple smaller evacuated tubes arranged within the larger evacuated tube; and
      a blackbody absorber positioned within each of the smaller evacuated tubes, each blackbody absorber comprising a heat pipe.

2. The apparatus of claim 1, wherein the collector is configured to increase at least one of a temperature differential and a pressure differential between the tanks based on the transfer of the solar thermal energy or the radiation of the thermal energy.

3. The apparatus of claim 1, wherein:
   the collector comprises a first collector configured to at least one of: transfer the solar thermal energy to the first tank and radiate the thermal energy from the first tank; and
   the apparatus further comprises a second collector configured to at least one of: transfer solar thermal energy to the second tank and radiate thermal energy from the second tank.

4. The apparatus of claim 1, further comprising:
   at least one turbine configured to turn based on the flow of the refrigerant;
   wherein the at least one generator is configured to generate the electrical power based on the turning of the at least one turbine.

5. The apparatus of claim 1, further comprising:
   a first piston configured to move based on the flow of the refrigerant; and
   a second piston coupled to the first piston, the second piston configured to move hydraulic fluid;
   wherein the at least one generator is configured to generate the electrical power based on the movement of the hydraulic fluid.

6. An apparatus comprising:
   first and second tanks each configured to receive and store a refrigerant under pressure;
   at least one generator configured to generate electrical power based on a flow of the refrigerant between the tanks;
   a collector configured to at least one of:
      transfer solar thermal energy to one of the tanks to heat the refrigerant in that tank; and
      radiate thermal energy from one of the tanks into an ambient environment to cool the refrigerant in that tank; and
   first and second insulated water jackets each configured to receive and retain water, the first tank located within the first insulated water jacket, the second tank located within the second insulated water jacket.

7. The apparatus of claim 6, wherein:
   the insulated water jackets are configured to receive and retain water of different temperatures to facilitate transport of the refrigerant between the tanks; and
   the collector is configured to at least one of:
      transfer the solar thermal energy to one of the water jackets in order to heat the water in that water jacket and to thereby heat the refrigerant in the associated tank; and
      radiate the thermal energy from one of the water jackets in order to cool the water in that water jacket and to thereby cool the refrigerant in the associated tank.

8. The apparatus of claim 7, wherein the collector comprises:
   a larger evacuated tube;
   multiple smaller evacuated tubes arranged within the larger evacuated tube; and
   a blackbody absorber positioned within each of the smaller evacuated tubes, each blackbody absorber comprising a heat pipe.

9. A system comprising:
   an underwater vehicle comprising a body and fins projecting from the body;
   the underwater vehicle also comprising a power generation system, wherein the power generation system comprises:
      first and second tanks each configured to receive and store a refrigerant under pressure;
      at least one generator configured to generate electrical power based on a flow of the refrigerant between the tanks; and
      a collector configured to at least one of:
         transfer solar thermal energy to one of the tanks to heat the refrigerant in that tank; and
         radiate thermal energy from one of the tanks into an ambient environment to cool the refrigerant in that tank;
      wherein the collector comprises:
         a larger evacuated tube;
         multiple smaller evacuated tubes arranged within the larger evacuated tube; and
         a blackbody absorber positioned within each of the smaller evacuated tubes, each blackbody absorber comprising a heat pipe.

10. The system of claim 9, wherein the underwater vehicle further comprises wings configured to be swept forward or backward depending on whether the underwater vehicle is ascending or descending.

11. The system of claim 9, wherein the collector is configured to increase at least one of a temperature differential and a pressure differential between the tanks based on the transfer of the solar thermal energy or the radiation of the thermal energy.

12. The system of claim 9, wherein:
the collector comprises a first collector configured to at least one of: transfer the solar thermal energy to the first tank and radiate the thermal energy from the first tank; and
the power generation system further comprises a second collector configured to at least one of: transfer solar thermal energy to the second tank and radiate thermal energy from the second tank.

13. A system comprising:
an underwater vehicle comprising a body and fins projecting from the body;
the underwater vehicle also comprising a power generation system, wherein the power generation system comprises:
first and second tanks each configured to receive and store a refrigerant under pressure;
at least one generator configured to generate electrical power based on a flow of the refrigerant between the tanks;
a collector configured to at least one of:
transfer solar thermal energy to one of the tanks to heat the refrigerant in that tank; and
radiate thermal energy from one of the tanks into an ambient environment to cool the refrigerant in that tank; and
first and second insulated water jackets each configured to receive and retain water, the first tank located within the first insulated water jacket, the second tank located within the second insulated water jacket.

14. The system of claim 13, wherein:
the insulated water jackets are configured to receive and retain water of different temperatures to facilitate transport of the refrigerant between the tanks; and
the collector is configured to at least one of:
transfer the solar thermal energy to one of the water jackets in order to heat the water in that water jacket and to thereby heat the refrigerant in the associated tank; and
radiate the thermal energy from one of the water jackets in order to cool the water in that water jacket and to thereby cool the refrigerant in the associated tank.

15. The system of claim 13, wherein the collector comprises:
a larger evacuated tube;
multiple smaller evacuated tubes arranged within the larger evacuated tube; and
a blackbody absorber positioned within each of the smaller evacuated tubes, each blackbody absorber comprising a heat pipe.

16. A method comprising:
generating electrical power based on a flow of refrigerant between first and second tanks, each of the tanks configured to receive and store the refrigerant under pressure; and
at least one of:
transferring solar thermal energy to one of the tanks to heat the refrigerant in that tank; and
radiating thermal energy from one of the tanks into an ambient environment to cool the refrigerant in that tank;
wherein transferring the solar thermal energy or radiating the thermal energy comprises using a collector having:
a larger evacuated tube;
multiple smaller evacuated tubes arranged within the larger evacuated tube; and
a blackbody absorber positioned within each of the smaller evacuated tubes, each blackbody absorber comprising a heat pipe.

17. The method of claim 16, wherein at least one of a temperature differential and a pressure differential between the tanks is increased based on the transfer of the solar thermal energy or the radiation of the thermal energy.

18. The method of claim 16, wherein:
transferring the solar thermal energy or radiating the thermal energy comprises transferring the solar thermal energy to the first tank or radiating the thermal energy from the first tank; and
the method further comprises at least one of: transferring solar thermal energy to the second tank and radiating thermal energy from the second tank.

19. A method comprising:
generating electrical power based on a flow of refrigerant between first and second tanks, each of the tanks configured to receive and store the refrigerant under pressure;
at least one of:
transferring solar thermal energy to one of the tanks to heat the refrigerant in that tank; and
radiating thermal energy from one of the tanks into an ambient environment to cool the refrigerant in that tank; and
receiving and retaining water in first and second insulated water jackets, the first tank located within the first insulated water jacket, the second tank located within the second insulated water jacket;
wherein at least one:
the solar thermal energy is transferred to one of the water jackets in order to heat the water in that water jacket and to thereby heat the refrigerant in the associated tank; and
the thermal energy is radiated from one of the water jackets in order to cool the water in that water jacket and to thereby cool the refrigerant in the associated tank.

20. The method of claim 19, wherein transferring the solar thermal energy or radiating the thermal energy comprises using a collector having:
a larger evacuated tube;
multiple smaller evacuated tubes arranged within the larger evacuated tube; and
a blackbody absorber positioned within each of the smaller evacuated tubes, each blackbody absorber comprising a heat pipe.

\* \* \* \* \*